US012561034B2

(12) United States Patent
Hara

(10) Patent No.: US 12,561,034 B2
(45) Date of Patent: Feb. 24, 2026

(54) INPUT SYSTEM, ELECTRONIC PEN, AND METHOD OF CONTROLLING ELECTRONIC PEN

(71) Applicant: Wacom Co., Ltd., Saitama (JP)

(72) Inventor: Hideyuki Hara, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/487,791

(22) Filed: Oct. 16, 2023

(65) Prior Publication Data

US 2024/0152238 A1     May 9, 2024

(30) Foreign Application Priority Data

Nov. 9, 2022     (JP) ................................. 2022-179694

(51) Int. Cl.
| | |
|---|---|
| *G06F 3/044* | (2006.01) |
| *G06F 3/0354* | (2013.01) |
| *G06F 3/038* | (2013.01) |
| *G06F 3/041* | (2006.01) |

(52) U.S. Cl.
CPC ........ *G06F 3/0442* (2019.05); *G06F 3/03545* (2013.01); *G06F 3/0383* (2013.01); *G06F 3/04162* (2019.05); *G06F 3/0441* (2019.05)

(58) Field of Classification Search
CPC .. G06F 3/0442; G06F 3/03545; G06F 3/0383; G06F 3/04162; G06F 3/0441; G06F 3/0412
See application file for complete search history.

(56) References Cited

U.S. PATENT DOCUMENTS

| | | | | |
|---|---|---|---|---|
| 10,631,079 | B2 * | 4/2020 | Kulkarni | G06F 3/03545 |
| 11,500,481 | B1 * | 11/2022 | Hung | G06F 3/0383 |
| 11,698,690 | B1 * | 7/2023 | Hung | G06F 3/03545 |
| | | | | 345/179 |
| 11,704,273 | B2 * | 7/2023 | Kawamata | G06F 13/4282 |
| | | | | 710/5 |
| 2006/0284854 | A1 * | 12/2006 | Cheng | G06F 3/03545 |
| | | | | 345/173 |

(Continued)

FOREIGN PATENT DOCUMENTS

JP          2017054544 A     3/2017

*Primary Examiner* — Jose R Soto Lopez
(74) *Attorney, Agent, or Firm* — Seed Intellectual Property Law Group LLP

(57) ABSTRACT

Disclosed is an input system including an electronic pen and an electronic device. The electronic device includes a touch sensor that performs capacitive coupling communication with the electronic pen, a sensor controller that performs communication control relating to the capacitive coupling communication, and a power transmitter that, in a case where the electronic pen is in a specific state, outputs, to the electronic pen, a power supply signal through a different communication from the capacitive coupling communication in response to a command from the sensor controller. The electronic pen includes a receiver that receives an uplink signal from the electronic device, a transmitter that transmits a downlink signal to the electronic device, a power receiver that receives the power supply signal from the electronic device through the different communication, and a pen controller that performs communication control and acquires data indicated by the power supply signal.

14 Claims, 6 Drawing Sheets

(56) References Cited

U.S. PATENT DOCUMENTS

| | | | | |
|---|---|---|---|---|
| 2008/0156546 | A1* | 7/2008 | Hauck | G06F 3/03545 |
| | | | | 345/179 |
| 2014/0029183 | A1* | 1/2014 | Ashcraft | G06F 1/26 |
| | | | | 361/679.02 |
| 2014/0078116 | A1* | 3/2014 | Mercea | G06F 3/03545 |
| | | | | 345/179 |
| 2014/0325402 | A1* | 10/2014 | Jung | G06F 1/1656 |
| | | | | 715/763 |
| 2015/0054797 | A1* | 2/2015 | Takahashi | G06F 3/04162 |
| | | | | 345/179 |
| 2016/0195941 | A1* | 7/2016 | Gur | G06F 3/044 |
| | | | | 345/173 |
| 2016/0209940 | A1* | 7/2016 | Geller | G06F 3/03545 |
| 2016/0266663 | A1* | 9/2016 | Holsen | G06F 3/04166 |
| 2016/0306445 | A1* | 10/2016 | Fleck | G06F 3/0383 |
| 2016/0306448 | A1* | 10/2016 | Fleck | G06F 3/0383 |
| 2016/0313814 | A1* | 10/2016 | Jacobs | H02J 7/0044 |
| 2017/0235560 | A1* | 8/2017 | McLean | G06F 3/03545 |
| | | | | 717/168 |
| 2017/0262084 | A1* | 9/2017 | Qiao | H04W 4/80 |
| 2017/0308186 | A1* | 10/2017 | Yamamoto | G06F 3/038 |
| 2018/0024658 | A1* | 1/2018 | Yamamoto | G06F 3/038 |
| | | | | 345/179 |
| 2018/0101250 | A1* | 4/2018 | Katsurahira | G06F 3/0441 |
| 2018/0120962 | A1* | 5/2018 | Hara | G06F 3/0414 |
| 2018/0164905 | A1* | 6/2018 | Yamamoto | G06F 3/0383 |
| 2018/0239444 | A1* | 8/2018 | Siddiqui | G06F 1/3215 |
| 2018/0329527 | A1* | 11/2018 | Park | G06F 3/0383 |
| 2018/0343079 | A1* | 11/2018 | Imanilov | H04L 63/0428 |
| 2019/0121453 | A1* | 4/2019 | Dekel | G06F 3/041 |
| 2019/0121455 | A1* | 4/2019 | Hara | G06F 3/0383 |
| 2020/0019257 | A1* | 1/2020 | Chang | G06F 3/03545 |
| 2020/0050338 | A1* | 2/2020 | Choi | H02J 50/12 |
| 2020/0081516 | A1* | 3/2020 | Zyskind | G06F 3/0346 |
| 2020/0081560 | A1* | 3/2020 | Geller | G06F 1/3259 |
| 2020/0097118 | A1* | 3/2020 | Kang | H04L 69/08 |
| 2020/0201505 | A1* | 6/2020 | Jung | G06F 3/0383 |
| 2021/0018996 | A1* | 1/2021 | Lee | G06F 3/0442 |
| 2021/0072876 | A1* | 3/2021 | Nomura | G06F 3/04166 |
| 2021/0109609 | A1* | 4/2021 | Holsen | G06F 1/3259 |
| 2021/0200356 | A1* | 7/2021 | Chung | G06F 3/0412 |
| 2021/0295573 | A1* | 9/2021 | Kim | G06F 1/1626 |
| 2021/0357045 | A1* | 11/2021 | Kadowaki | G06F 3/04142 |
| 2021/0376453 | A1* | 12/2021 | Han | H01Q 21/064 |
| 2021/0384754 | A1* | 12/2021 | Xu | H01F 7/02 |
| 2022/0057909 | A1* | 2/2022 | Lee | G06F 1/3215 |
| 2022/0155878 | A1* | 5/2022 | Park | G06F 1/1698 |
| 2022/0200337 | A1* | 6/2022 | Watanabe | G06F 3/046 |
| 2022/0334701 | A1* | 10/2022 | Cheng | G06F 3/0441 |
| 2023/0004234 | A1* | 1/2023 | Jung | G06F 3/041 |
| 2023/0039061 | A1* | 2/2023 | Dongbang | G06F 3/04164 |
| 2023/0266841 | A1* | 8/2023 | Van Ostrand | G06F 3/0446 |
| | | | | 345/178 |
| 2023/0289011 | A1* | 9/2023 | Rosenberg | G06F 3/03545 |
| 2023/0289025 | A1* | 9/2023 | Jung | G06F 3/04812 |
| 2024/0094841 | A1* | 3/2024 | Li | G06F 3/03545 |
| 2024/0176403 | A1* | 5/2024 | Zhang | G06F 1/1698 |
| 2024/0232317 | A1* | 7/2024 | Kothapally | G06F 3/0442 |
| 2024/0372404 | A1* | 11/2024 | Wu | H02J 7/00032 |

* cited by examiner

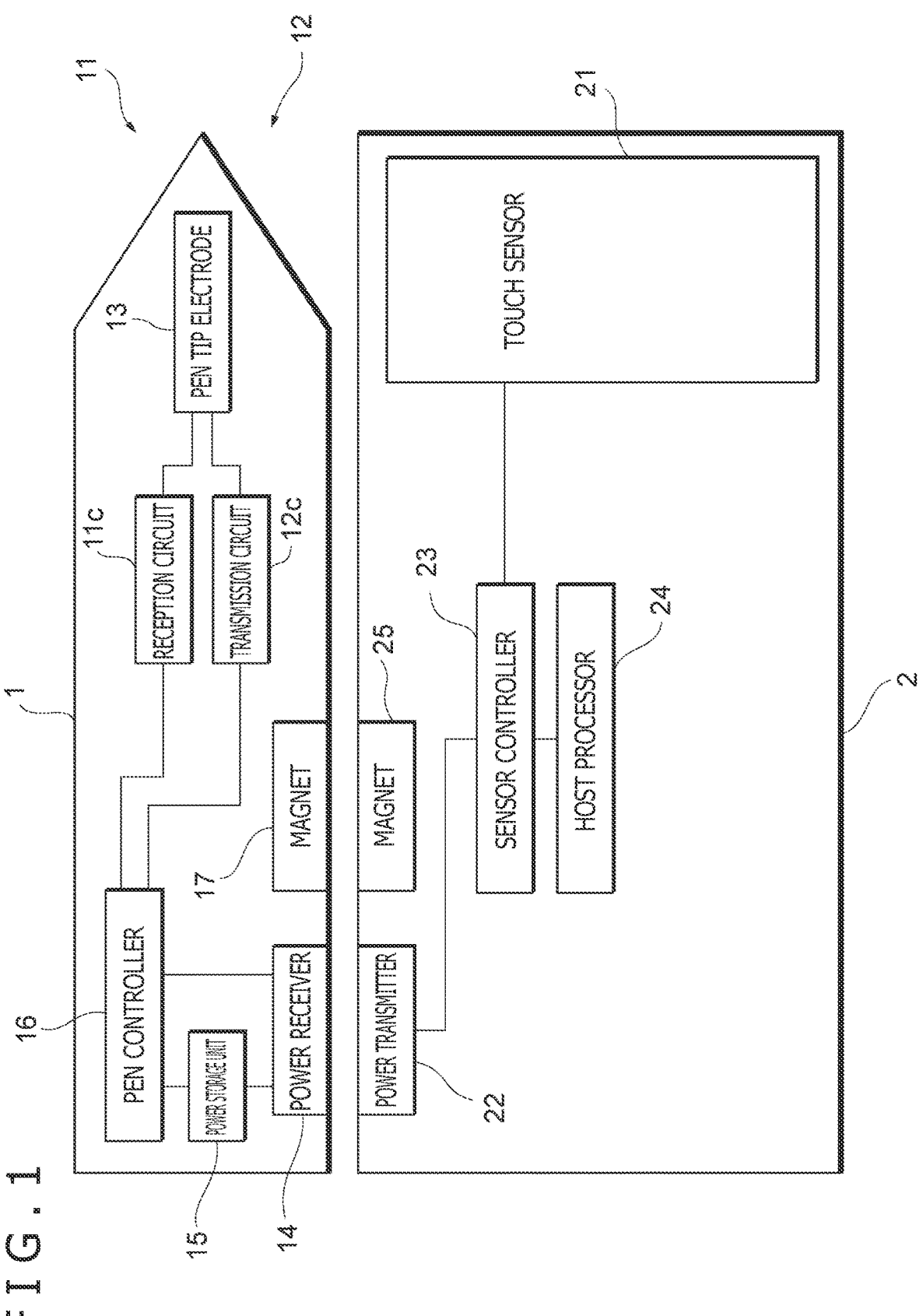
F I G . 1

DOWNLINK SIGNAL          UPLINK SIGNAL

DOWNLINK SIGNAL

F I G . 4
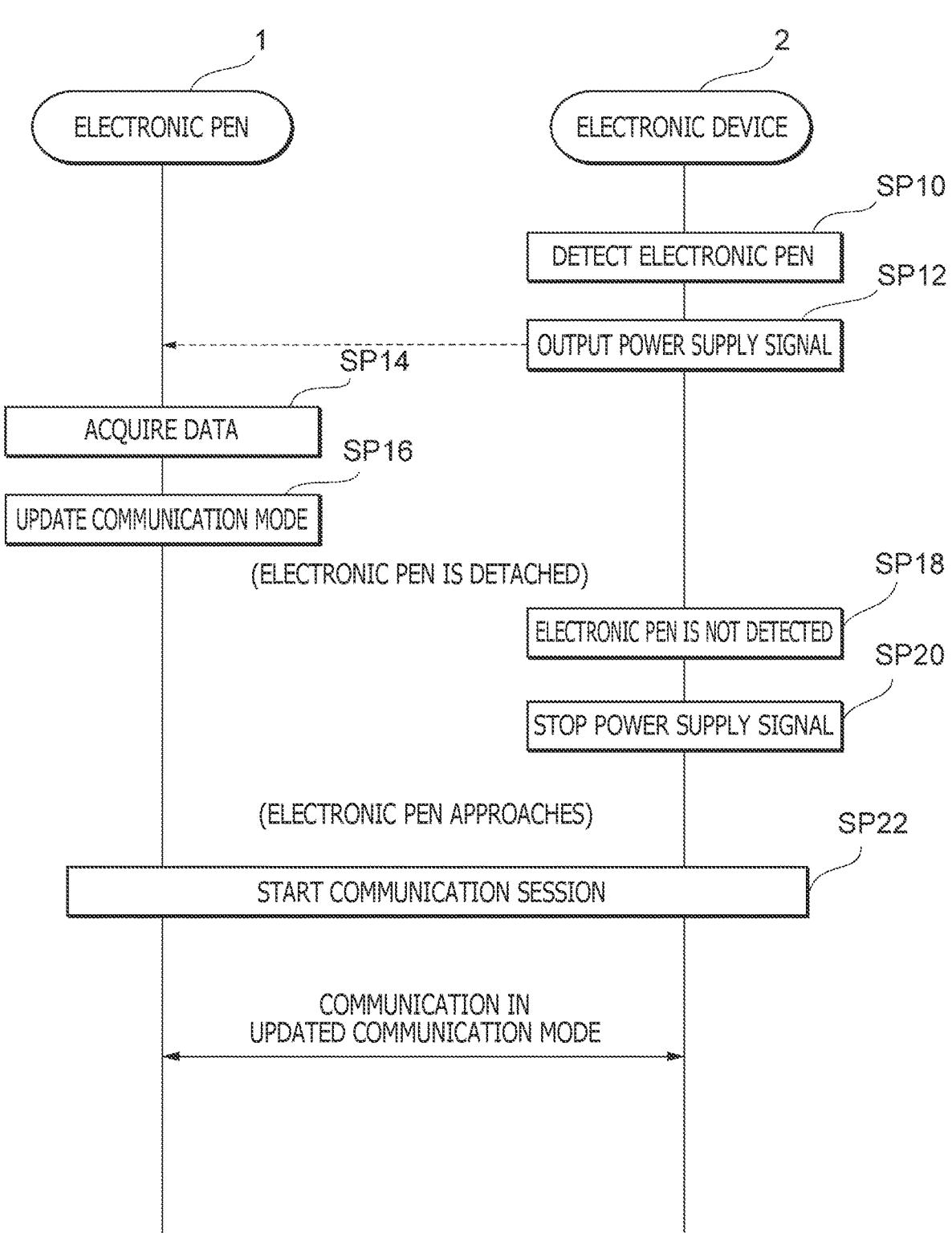

INPUT SYSTEM, ELECTRONIC PEN, AND METHOD OF CONTROLLING ELECTRONIC PEN

BACKGROUND

Technical Field

The present disclosure relates to an input system, an electronic pen, and a method of controlling the electronic pen.

Description of the Related Art

Conventionally, there have been known input systems including an electronic pen (or stylus) that is a position indicator and an electronic device including a touch sensor. For example, there have been proposed various techniques that allow a capacitive coupling electronic pen to optimize a communication operation between the electronic pen and an electronic device.

Japanese Patent Laid-Open No. 2017-054544 (hereinafter, referred to as "Patent document 1") discloses an active stylus operable to transmit and receive signals to and from a sensor controller via capacitive coupling between the active stylus and a sensor to which the sensor controller is connected. The sensor controller is capable of receiving either a first pen signal or a second pen signal. The active stylus disclosed in Patent Document 1 transitions to an operation mode in response to the detection of the contact made by the active stylus on an operation surface.

However, since a pen-down operation is usually performed after the start of a communication session, the timing of updating the communication mode may be delayed with the electronic pen disclosed in Patent Document 1.

BRIEF SUMMARY

It is desirable to provide an input system, an electronic pen, and a method of controlling the electronic pen that can automatically switch or prepare to switch the communication mode relating to capacitive coupling communication, at a timing earlier than the pen-down operation.

An input system according to a first aspect of the present disclosure is a system including an electronic pen and an electronic device that, in operation, communicates with the electronic pen. The electronic device includes a touch sensor that, in operation, performs capacitive coupling communication with the electronic pen, a sensor controller that, in operation, performs communication control relating to the capacitive coupling communication with the electronic pen performed by the touch sensor, and a power transmitter that, in a case where the electronic pen is in a specific state, outputs, to the electronic pen, a power supply signal that supplies power to the electronic pen through a different communication from the capacitive coupling communication in response to a command from the sensor controller. The electronic pen includes a receiver that, in operation, receives an uplink signal from the electronic device, a transmitter that, in operation, transmits a downlink signal to the electronic device, a power receiver that, in operation, receives the power supply signal from the electronic device through the different communication, and a pen controller that, in operation, performs communication control on the receiver and the transmitter according to a communication mode relating to the capacitive coupling communication and acquires data indicated by the power supply signal received by the power receiver. The data includes update information that requests update of the communication mode. The pen controller, in operation, updates the communication mode or prepares to update the communication mode according to contents of the update information.

An electronic pen according to a second aspect of the present disclosure is a pen used with an electronic device. The electronic device includes a touch sensor that, in operation, performs capacitive coupling communication with the electronic pen, a sensor controller that, in operation, performs communication control relating to the capacitive coupling communication with the electronic pen performed the touch sensor, and a power transmitter that, in a case where the electronic pen is in a specific state, outputs, to the electronic pen, a power supply signal that supplies power to the electronic pen through a different communication from the capacitive coupling communication in response to a command from the sensor controller. The electronic pen includes a receiver that, in operation, receives an uplink signal from the electronic device, a transmitter that, in operation, transmits a downlink signal to the electronic device, a power receiver that, in operation, receives the power supply signal from the electronic device through the different communication, and a pen controller that, in operation, performs communication control according to a communication mode relating to the capacitive coupling communication via the receiver and the transmitter and acquires data indicated by the power supply signal received by the power receiver. The data includes update information for requesting update of the communication mode. The pen controller, in operation, updates the communication mode or prepares to update the communication mode according to contents of the update information.

A method of controlling an electronic pen according to a third aspect of the present disclosure is a method of controlling an electronic pen used with an electronic device. The electronic device includes a touch sensor that, in operation, performs capacitive coupling communication with the electronic pen, a sensor controller that, in operation, performs communication control relating to the capacitive coupling communication with the electronic pen performed by the touch sensor, and a power transmitter that, in a case where the electronic pen is in a specific state, outputs, to the electronic pen, a power supply signal that supplies power to the electronic pen through a different communication from the capacitive coupling communication in response to a command from the sensor controller. The electronic pen includes a receiver that, in operation, receives an uplink signal from the electronic device, a transmitter that, in operation, transmits a downlink signal to the electronic device, a power receiver that, in operation, receives the power supply signal from the electronic device through the different communication, and a pen controller that, in operation, performs communication control according to a communication mode relating to the capacitive coupling communication via the receiver and the transmitter and acquires data indicated by the power supply signal received by the power receiver. The method includes, by the pen controller, acquiring the data including update information that request an update of the communication mode, and updating the communication mode or preparing to update the communication mode according to contents of the update information.

According to the present disclosure, it is possible to automatically switch or prepare to switch the communication mode relating to capacitive coupling communication, at a timing earlier than the pen-down operation.

BRIEF DESCRIPTION OF THE SEVERAL
VIEWS OF THE DRAWINGS

FIG. 1 is a block diagram schematically illustrating an example of an overall configuration of an input system according to an embodiment of the present disclosure;

FIG. 4 is a sequence diagram illustrating a first example of a mode updating operation performed by the input system of FIG. 1;

DETAILED DESCRIPTION

Figure 2:
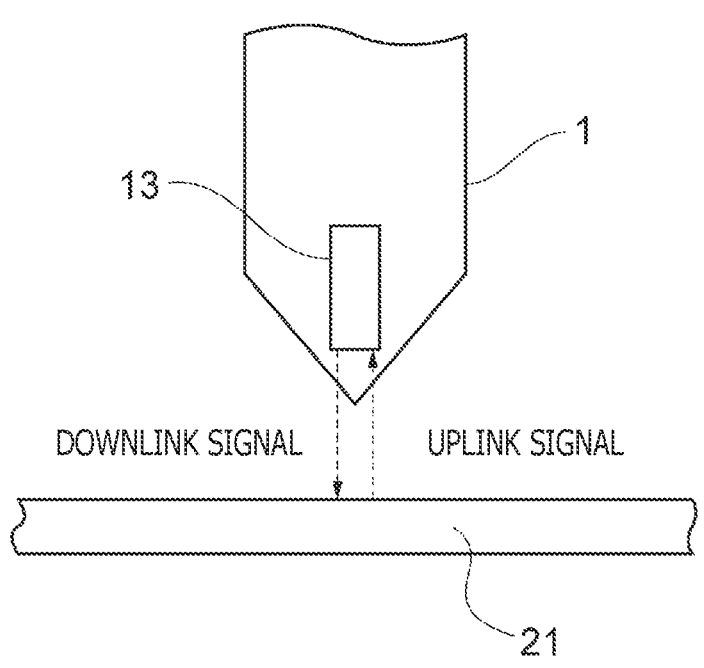
FIG. 2 is a diagram schematically illustrating a bidirectional mode.

An embodiment of the present disclosure is described below with reference to the accompanying drawings. The same constituent components are denoted with the same signs in each drawing as much as possible to facilitate understanding of the description, and redundant description is omitted as appropriate.

Configuration of Input System

FIG. 1 is a block diagram schematically illustrating an example of an overall configuration of an input system according to an embodiment of the present disclosure (hereinafter referred to as the "present embodiment"). As illustrated in FIG. 1, the input system according to the present embodiment includes, as its main components, an electronic pen 1 and an electronic device 2 which communicates with the electronic pen 1. A user can perform desired operations such as drawing pictures or characters on the electronic device 2 by moving a pen tip of the electronic pen 1 on a touch surface of the electronic device 2 while pressing the pen tip against the touch surface or by moving the user's finger in contact with the touch surface.

Device Configuration of Electronic Pen 1

In the present embodiment, the electronic pen 1 includes an active stylus of an active capacitive coupling (active electrostatic (AES)) system. Specifically, the electronic pen 1 includes a receiver 11, a transmitter 12, a power receiver 14, a power storage unit 15, a pen controller 16, and a magnet 17 as main components. In addition to the above-described configuration, the electronic pen 1 also includes a pen pressure sensor that detects the pen pressure and a switch operation part that accepts a pressing operation performed by the user although figures and detailed descriptions of these components are omitted.

The receiver 11 receives a signal (hereinafter referred to as an "uplink signal") transmitted via a touch sensor 21 which is included in the electronic device 2, under the reception control performed by the pen controller 16. Specifically, the receiver 11 includes a pen tip electrode 13 which is provided at the tip of the electronic pen 1 and a reception circuit 11c which is connected to the pen tip electrode 13.

The transmitter 12 generates a downlink signal and transmits the downlink signal to the electronic device 2 under the transmission control performed by the pen controller 16. Specifically, the transmitter 12 includes the pen tip electrode 13, which is provided at the tip of the electronic pen 1, and a transmission circuit 12c which is connected to the pen tip electrode 13. Although the pen tip electrode 13 of the receiver 11 and the pen tip electrode 13 of the transmitter 12 have the same configuration in FIG. 1, they may have separate configurations.

The power receiver 14 receives a signal (hereinafter referred to as a "power supply signal") for supplying power to the electronic pen 1 from the electronic device 2. For example, in the case of the electromagnetic induction wireless power supply, the power receiver 14 includes a power receiving element including a power receiving coil and a one-turn coil for receiving power. In the case of the electric-field coupling wireless power supply, the power receiver 14 includes a power receiving element including a pair of electrodes.

The above-described power supply signal may be either a wireless signal or a wired signal. In the case of the wireless signal, the power supply signal is transmitted through an electromagnetic wave including an electric field, a magnetic field, or both of them. The power supply standard using wireless or wired signals may be a standard established by an organization or may be a proprietary standard. Examples of the standard for wireless power supply include Qi (registered trademark) and near field communication (NFC). Examples of the standard for wired power supply include a universal serial bus (USB) Type-C (registered trademark) and USB power delivery (PD).

The power storage unit 15 includes, for example, a battery and a capacitor and supplies power to a driving unit including the pen controller 16. The power storage unit 15 is charged when the electrical energy included in the power supply signal is supplied thereto.

The pen controller 16 includes an integrated circuit connected to each of the reception circuit 11c, the transmission circuit 12c, and the power receiver 14. Specifically, the pen controller 16 includes a processor including a micro control unit (MCU) and a non-volatile memory. This memory stores various programs necessary for the execution of processing in the electronic pen 1 or various types of data including identification information (i.e., pen identification (ID)) of the pen controller 16. Accordingly, the pen controller 16 performs [1] the reception control for the receiver 11, [2] the transmission control for the transmitter 12, and [3] the power receiving control for the power receiver 14.

The magnet 17 has a magnetic pole opposite to that of a magnet 25 described later. Instead of a permanent magnet, the magnet 17 may include a magnetic body that is magnetized when the power is supplied thereto. The magnet 17 is, for example, provided on an outer surface of a casing not illustrated.

Device Configuration of Electronic Device 2

In the present embodiment, the electronic device 2 is a computer including, for example, a tablet terminal, a smartphone, or a personal computer. Specifically, the electronic device 2 includes the touch sensor 21, a power transmitter 22, a sensor controller 23, a host processor 24, and the magnet 25 as main components.

The touch sensor 21 is a capacitive coupling plane-shaped sensor including a plurality of detection electrodes arranged in a plane shape. The touch sensor 21 includes, for example, a plurality of X line electrodes for detecting an X-axis position in a sensor coordinate system and a plurality of Y line electrodes for detecting a Y-axis position in the sensor coordinate system. Each line electrode may include a transparent conductive material including indium tin oxide (ITO) or a wire mesh sensor. Instead of the mutual capacitive sensor described above, the touch sensor 21 may be a self-capacitive sensor in which block-shaped electrodes are arranged in a two-dimensional grid.

The power transmitter 22 outputs the power supply signal including data generated by the sensor controller 23 to the electronic pen 1. For example, in the case of the electromagnetic induction wireless power supply, the power transmitter 22 includes a power transmitting element including a one-turn coil for transmitting power and a power transmitting coil. In the case of the electric-field coupling wireless power supply, the power transmitter 22 includes a power transmitting element including a pair of electrodes.

The sensor controller 23 includes an integrated circuit connected to each of the touch sensor 21 and the power transmitter 22. Specifically, the sensor controller 23 includes a processor including an MCU and a non-volatile memory. This memory stores various programs necessary for the execution of processing in the electronic device 2 or various types of data including identification information of the sensor controller 23. Accordingly, the sensor controller 23 performs [1] the transmission and reception control for the touch sensor 21, [2] the output control for the power transmitter 22, and [3] the cooperative operation performed in cooperation with the host processor 24.

The host processor 24 is a processor including a central processing unit (CPU) or a graphics processing unit (GPU). The host processor 24 reads and executes a program from the non-volatile memory, not illustrated, to perform various functions including, for example, a process of generating stroke data by using data received from the sensor controller 23 and rendering and displaying the stroke data on a display panel, as well as data transmission and reception control.

The magnet 25 has a magnetic pole opposite to that of the magnet 17 described above. Instead of a permanent magnet, the magnet 25 may include a magnetic body that is magnetized when the power is supplied thereto. The magnet 25 is, for example, provided on a side portion of a casing not illustrated.

Operation of Input System

An operation of the input system according to the present embodiment is described below with reference to FIGS. 1 and 2 through 7.

Communication Mode

The electronic pen 1 and the electronic device 2 communicate with each other via the pen tip electrode 13 and the touch sensor 21 on the basis of the capacitive coupling system. During this communication, the pen controller 16 of the electronic pen 1 performs communication control according to a plurality of types of communication modes.

The types of communication modes (or mode types) are broadly classified into the mode types classified by function and the mode types classified by standard. Examples of the mode types classified by function include [1] a unidirectional mode, [2] a bidirectional mode (more specifically, a synchronous mode/an asynchronous mode), [3] a continuous transmission mode, and [4] an intermittent transmission mode. Examples of the mode types classified by standard include the proprietary protocol defined by each manufacturer of the electronic pen 1 and the proprietary protocol defined by each manufacturer of the electronic device 2.

FIG. 2 is a diagram schematically illustrating the bidirectional mode. The electronic device 2 transmits the uplink signal at predetermined cycles. This uplink signal is received by the electronic pen 1 located near the electronic device 2. In response to the reception of the uplink signal, the electronic pen 1 generates the downlink signal and transmits it to the electronic device 2. This downlink signal is received by the electronic device 2 located near the electronic pen 1. In this way, the "bidirectional mode" corresponds to a communication mode in which the bidirectional communication is performed such that the electronic pen 1 performs both the reception of the uplink signal and the transmission of the downlink signal. In particular, the "synchronous mode" corresponds to a communication mode in which the electronic pen 1 transmits the downlink signal to the electronic device 2 at a timing (time slot) based on the indication included in the uplink signal received from the electronic device 2. The "asynchronous mode" corresponds to a communication mode in which the electronic pen 1 transmits the downlink signal to the electronic device 2 at a timing (time slot) that is not based on the indication included in the uplink signal.

Figure 3:
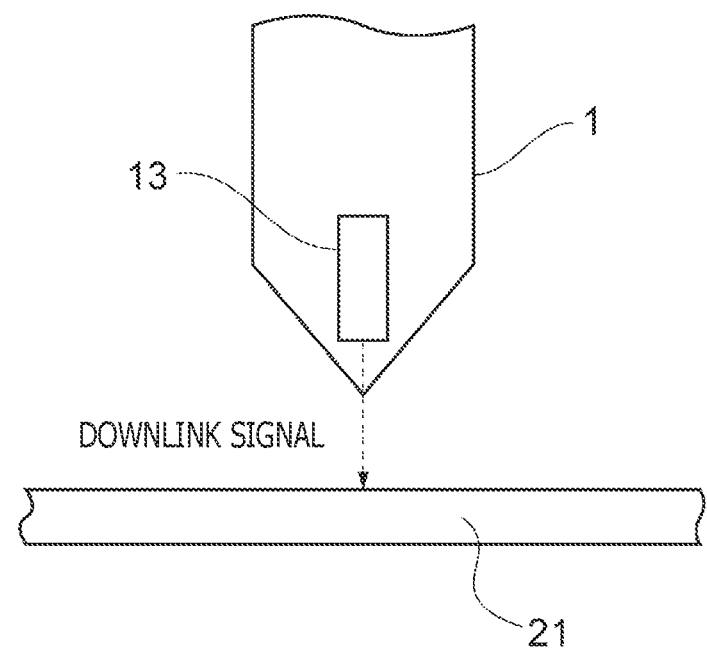
FIG. 3 is a diagram schematically illustrating a unidirectional mode.

FIG. 3 is a diagram schematically illustrating the unidirectional mode. When the first transmission timing arrives, the electronic device 2 generates the uplink signal and transmits it to the electronic pen 1. This uplink signal is received by the electronic pen 1 located near the electronic device 2. After a predetermined period of time (i.e., transmission cycle) has elapsed since the first transmission timing, the electronic pen 1 generates the downlink signal and transmits it to the electronic device 2. This transmission is performed regardless of whether or not the electronic device 2 near the electronic pen 1 has transmitted the uplink signal. Thus, the "unidirectional mode" corresponds to a communication mode in which unidirectional communication is performed such that the electronic pen 1 performs only the transmission of the downlink signal in response to the reception of the uplink signal from the electronic device 2.

For example, in the case where both the electronic pen 1 and the electronic device 2 are set to the "bidirectional mode," the electronic pen 1 and the electronic device 2 can smoothly start a communication session according to the same communication mode (i.e., the bidirectional mode). However, in the case where the electronic pen 1 is set to the "unidirectional mode" while the electronic device 2 is set to the "synchronous mode," there is a possibility that the communication session cannot start smoothly due to a delay in the reception of the uplink signal by the electronic pen 1. Therefore, the input system according to the present embodiment performs an operation (hereinafter referred to as "mode changing operation") of automatically switching the communication mode at an earlier timing through the cooperation between the electronic pen 1 and the electronic device 2.

Mode Changing Operation

First, the sensor controller 23 of the electronic device 2 detects whether or not the electronic pen 1 is in a specific state. Here, the "specific state" indicates that the electronic pen 1 is in a state in which power can be supplied thereto. Examples of the "specific state" include: [1] the magnitude of a magnetic force detected by a magnetic sensor provided near the magnet 25 has exceeded a threshold value, [2] an object (in this case, the electronic pen 1) has been detected by an optical sensor provided near the power transmitter 22, and [3] the electrical connection between the electronic pen 1 and the electronic device 2 has been confirmed.

When the above-described specific state has been detected, the sensor controller 23 generates data to be provided to the electronic pen 1 and outputs the data to the power transmitter 22. This data includes information (hereinafter referred to as "update information") for requesting the update of the communication mode performed by the electronic pen 1. Here, the "update of the communication mode" indicates [1] "switching" to one type of communication mode from among a plurality of types of communication modes or [2] "changing" a communication control condition for specifying the communication operation of the electronic pen 1 in one type of communication mode. The update information includes at least one of [1] the type of communication mode, [2] the communication control condition, and [3] a command (hereinafter referred to as a "negotiation command") requesting negotiation for updating the communication mode. Examples of the communication control condition include the transmission cycle (what is called slot time), the frequency to be used, the waveform and amplitude of the carrier wave, and the signal format.

The power transmitter 22 performs signal processing, including modulation processing, on the data supplied from the sensor controller 23 and outputs the resulting power supply signal to the electronic pen 1 (in other words, the power transmitter 22 outputs the power supply signal to the electronic pen 1 through a different communication from the capacitive coupling communication). In response, the pen controller 16 of the electronic pen 1 receives the power supply signal via the power receiver 14 and also acquires the data indicated by the power supply signal.

The pen controller 16 updates the communication mode according to the contents of the update information included in the acquired data. For example, in the case where the mode type included in the update information indicates a selectable value, the pen controller 16 switches to the corresponding type of communication mode. In the case where the communication control condition included in the update information indicates a selectable value, the pen controller 16 changes to the corresponding communication control condition.

Before changing the communication mode, the pen controller 16 may determine whether or not the communication mode can be updated, on the basis of the contents of the update information. For example, in the case where the mode type or communication control condition included in the update information indicates a selectable value, the pen controller 16 determines that the communication mode can be updated, and updates to the corresponding communication mode. On the other hand, in the case where the mode type or communication control condition included in the update information indicates a value that is not selectable, the pen controller 16 determines that the communication mode cannot be updated, and does not update the communication mode.

The pen controller 16 may also prepare to update the communication mode on the basis of the contents of the update information included in the data. Here, "prepare to update" indicates that the pen controller 16 does not update the communication mode while the electronic pen 1 is receiving the power supply signal, but is in a state in which the pen controller 16 can update the communication mode after the electronic pen 1 stops receiving the power supply signal. For example, "prepare to update" includes an operation relating to negotiation (hereinafter referred to as "negotiation operation") conducted with the electronic device 2 to determine the communication mode.

In the case where the negotiation command is included in the update information, the pen controller 16 may determine that the negotiation operation is required to be performed, and may start the negotiation operation in response to the connection with the electronic device 2 in the capacitive coupling communication. With regard to this negotiation operation, either the pen controller 16 or the sensor controller 23 may determine the communication mode. Further, in the case where the negotiation operation cannot be performed by the time the valid period has elapsed since it was determined that the above-described negotiation operation is required to be performed, the pen controller 16 may terminate the negotiation operation.

In the case where the pen controller 16 determines that the negotiation operation is required to be performed and where the reception of the uplink signal in the receiver 11 is set to "disabled," the pen controller 16 may switch the reception of the uplink signal from "disabled" to "enabled" and start the negotiation operation. Here, "the reception is disabled" indicates [1] the state in which the uplink signal is not received or [2] the state in which the data indicated by the received uplink signal is not used in the arithmetic processing. For example, the pen controller 16 may start the negotiation operation after temporarily switching from the "unidirectional mode" to the "bidirectional mode."

First Example of Mode Updating Operation

A first example of the mode updating operation performed by the input system is described below with reference to a sequence diagram of FIG. 4. The first example assumes a case in which no negotiation operation is performed between the electronic pen 1 and the electronic device 2.

At SP10 of FIG. 4, the user fixedly positions the electronic pen 1 on a side portion of the electronic device 2 while the electronic pen 1 is not in use. Then, the sensor controller 23 of the electronic device 2 confirms that the specific state of the electronic pen 1, that is, the state in which the magnets 17 and 25 are attracted to each other, has been detected.

At SP12, the power transmitter 22 of the electronic device 2 starts outputting the power supply signal to the power receiver 14 of the electronic pen 1 in response to the command of the sensor controller 23 after starting the detection at SP10.

At SP14, the pen controller 16 of the electronic pen 1 acquires the data indicated by the power supply signal received via the power receiver 14. Here, it is assumed that the mode type of the "bidirectional mode" is included in the data.

At SP16, the pen controller 16 of the electronic pen 1 updates the communication mode according to the contents of the data acquired at SP14. Accordingly, the communication mode to be performed by the electronic pen 1 is updated to the "bidirectional mode." After that, SP12 to SP16 are repeated sequentially.

At SP18, the user detaches the electronic pen 1 from the side portion of the electronic device 2 in order to use the electronic pen 1. Then, the sensor controller 23 of the electronic device 2 confirms that the specific state of the electronic pen 1, that is, the state in which the magnets 17 and 25 are attracted to each other, is not detected.

At SP20, the power transmitter 22 of the electronic device 2 stops outputting the power supply signal to the power receiver 14 of the electronic pen 1 after the detection at SP18.

After the output of the power supply signal stops at SP20, the pen tip electrode 13 of the electronic pen 1 approaches the touch sensor 21 of the electronic device 2, which causes the electronic pen 1 and the electronic device 2 to start a communication session based on the capacitive coupling system at SP22. After that, communication is performed according to the communication mode (i.e., the bidirectional mode) updated at SP16.

Second Example of Mode Updating Operation

A second example of the mode updating operation performed by the input system is described below with reference to a sequence diagram of FIG. 5. The second example assumes a case in which the negotiation operation is performed between the electronic pen 1 and the electronic device 2.

Figure 5:
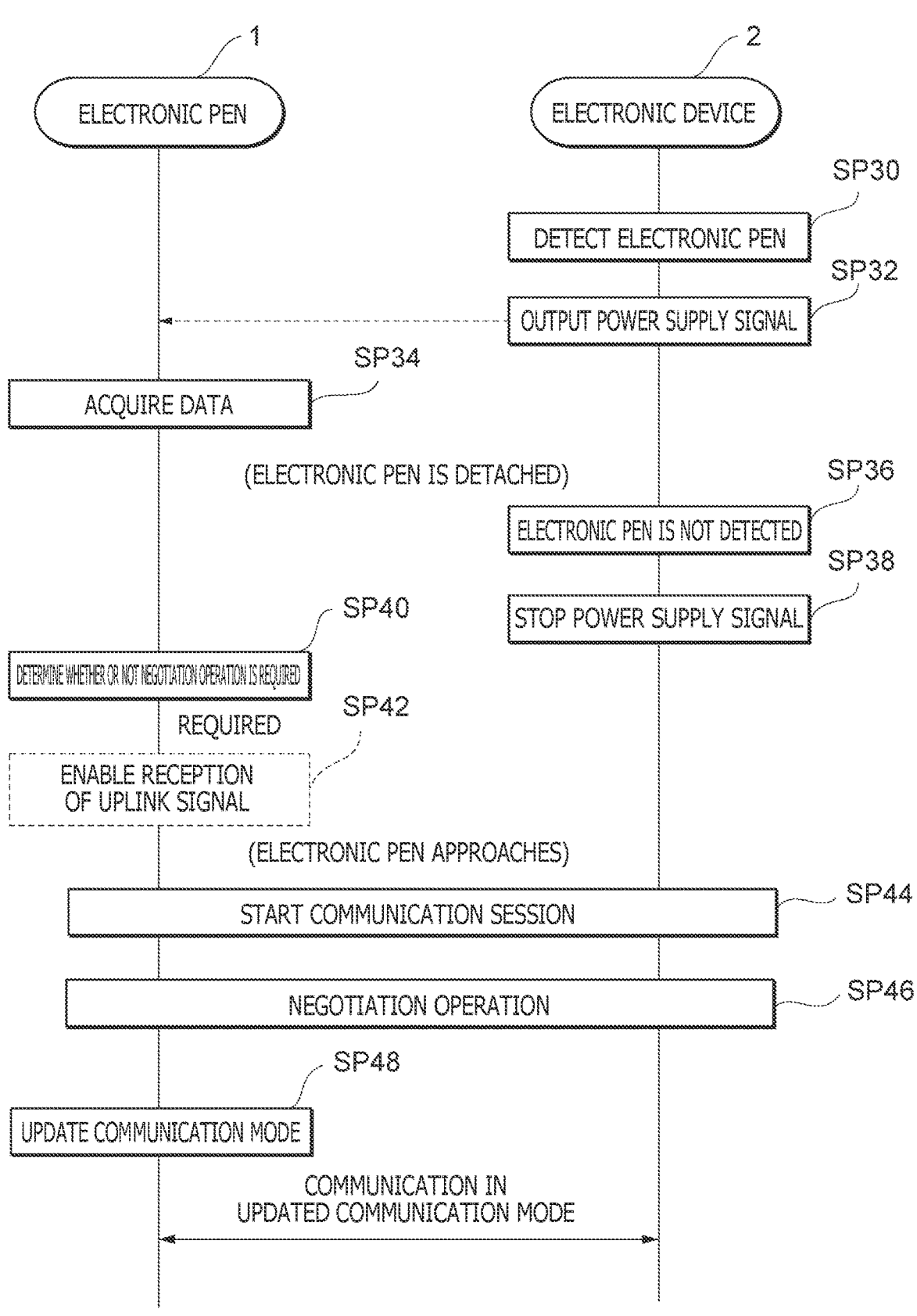
FIG. 5 is a sequence diagram illustrating a second example of the mode updating operation performed by the input system of FIG. 1.

At SP30 of FIG. 5, the user fixedly positions the electronic pen 1 on the side portion of the electronic device 2 while the electronic pen 1 is not in use. Then, the sensor controller 23 of the electronic device 2 confirms that the specific state of the electronic pen 1, that is, the state in which the magnets 17 and 25 are attracted to each other, has been detected.

At SP32, the power transmitter 22 of the electronic device 2 starts outputting the power supply signal to the power receiver 14 of the electronic pen 1 in response to the command of the sensor controller 23 after starting the detection at SP30.

At SP34, the pen controller 16 of the electronic pen 1 acquires the data indicated by the power supply signal received via the power receiver 14. Here, it is assumed that the negotiation command is included in the data. After that, SP32 to SP34 are repeated sequentially.

At SP36, the user detaches the electronic pen 1 from the side portion of the electronic device 2 in order to use the electronic pen 1. Then, the sensor controller 23 of the electronic device 2 confirms that the specific state of the electronic pen 1, that is, the state in which the magnets 17 and 25 are attracted to each other, is not detected.

At SP38, the power transmitter 22 of the electronic device 2 stops outputting the power supply signal to the power receiver 14 of the electronic pen 1 after the detection at SP36.

At SP40, the pen controller 16 of the electronic pen 1 determines whether or not the negotiation operation is required to be performed, according to the contents of the data acquired at SP34. Here, since the update information includes the negotiation command, the pen controller 16 determines that the negotiation operation is "required" to be performed, and proceeds to SP42.

At SP42, the pen controller 16 of the electronic pen 1 enables the reception of the uplink signal, if required. For example, the pen controller 16 switches the communication mode from the "unidirectional mode" to the "bidirectional mode" and stands-by.

At SP44, the pen tip electrode 13 of the electronic pen 1 approaches the touch sensor 21 of the electronic device 2, which causes the electronic pen 1 and the electronic device 2 to start a communication session based on the capacitive coupling system.

At SP46, the pen controller 16 of the electronic pen 1 performs the negotiation operation with the sensor controller 23 of the electronic device 2 in response to the start of the communication session at SP44. Through this negotiation operation, the communication mode to be updated to is determined.

At SP48, the pen controller 16 of the electronic pen 1 switches to the communication mode determined through the negotiation operation at SP46. After that, communication is performed according to the communication mode updated at SP48.

First Example of Negotiation Operation

Figure 6:
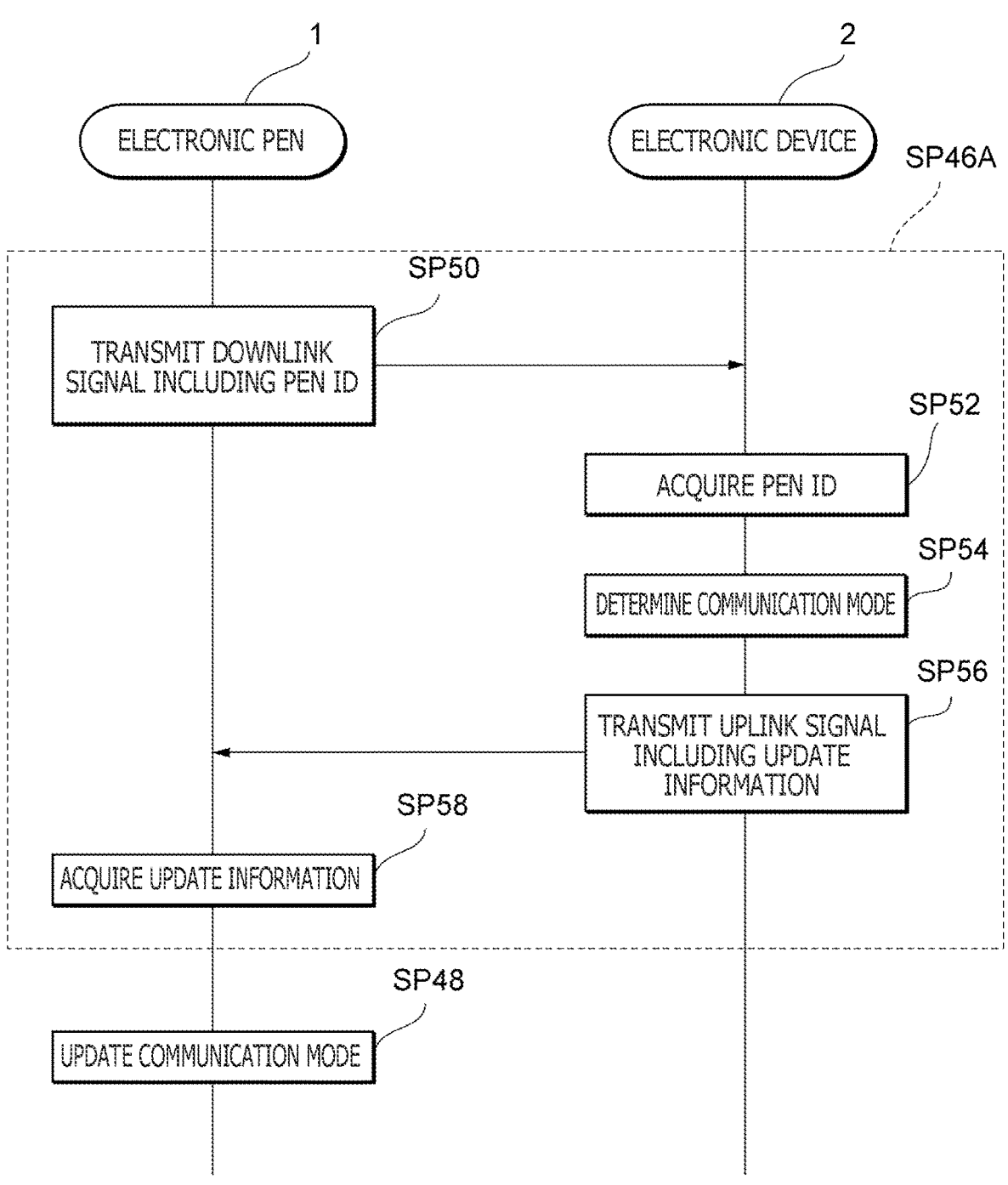
FIG. 6 is a sequence diagram illustrating a first example of a negotiation operation performed by the input system of FIG. 1.

Next, SP46A, which is a first example of the negotiation operation (SP46 of FIG. 5), is described in detail with reference to a sequence diagram of FIG. 6.

At SP50, the electronic pen 1 transmits the downlink signal including its own identification information (i.e., pen ID) to the electronic device 2.

At SP52, the electronic device 2 receives the downlink signal transmitted at SP50 and acquires the pen ID included in the downlink signal.

At SP54, the electronic device 2 determines the communication mode to be changed to on the basis of the pen ID acquired at SP52.

At SP56, the electronic device 2 transmits the uplink signal including the update information (in this case, the mode type or the communication control condition) relating to the communication mode determined at SP54 to the electronic pen 1.

At SP58, the pen controller 16 of the electronic pen 1 receives the uplink signal transmitted at SP58 and also acquires the update information included in the uplink signal. The negotiation operation at SP46A ends in this way, and the pen controller 16 of the electronic pen 1 proceeds to SP48 (FIG. 5).

Second Example of Negotiation Operation

Figure 7:
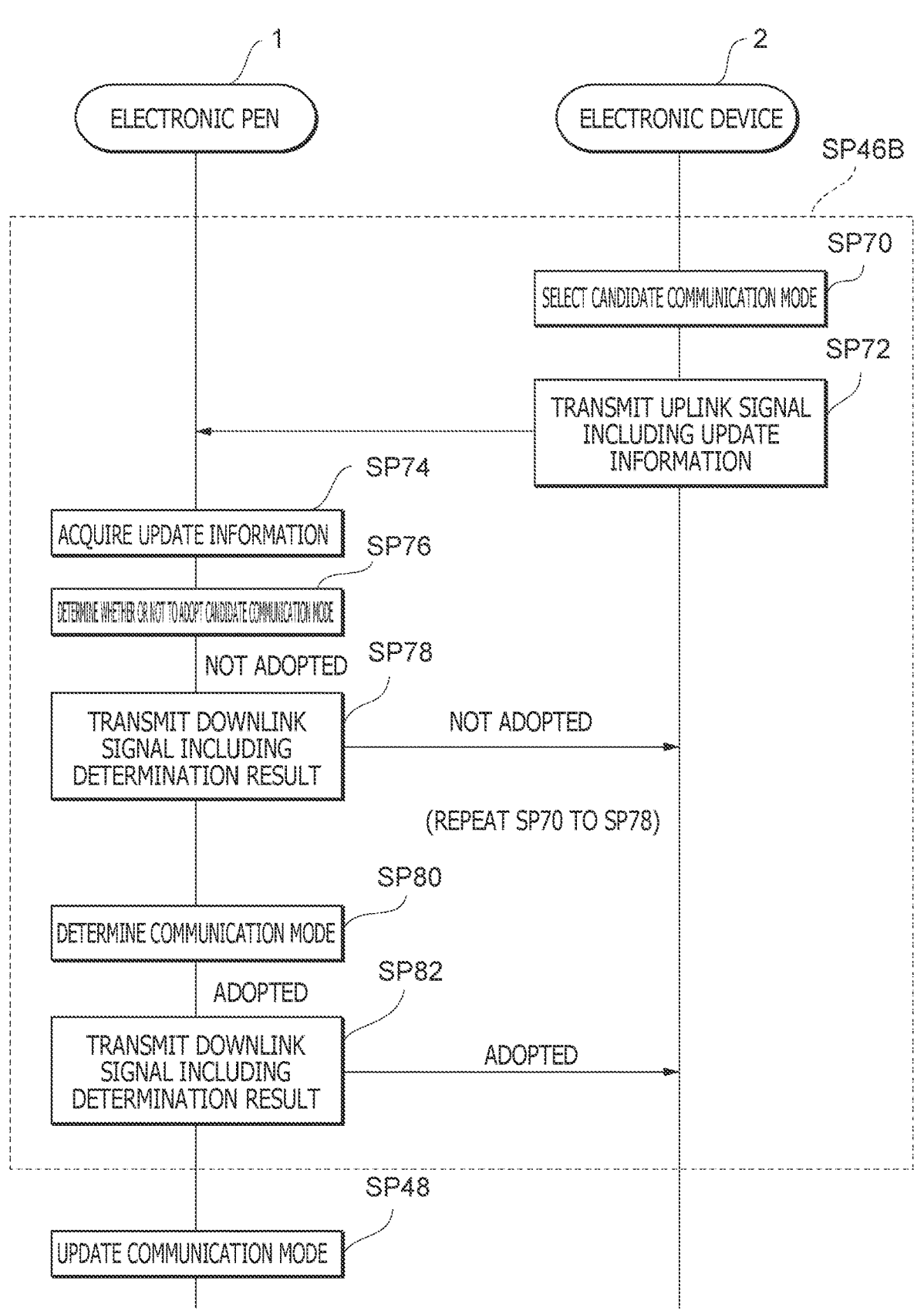
FIG. 7 is a sequence diagram illustrating a second example of the negotiation operation performed by the input system of FIG. 1.

Next, SP46B, which is a second example of the negotiation operation (SP46 of FIG. 5), is described in detail with reference to a sequence diagram of FIG. 7.

At SP70, the electronic device 2 selects one type of candidate communication mode that has not yet been selected from among a plurality of types of communication modes.

At SP72, the electronic device 2 transmits the uplink signal including the update information (in this case, the mode type or the communication control condition) relating to the candidate communication mode selected at SP70 to the electronic pen 1.

At SP74, the pen controller 16 of the electronic pen 1 receives the uplink signal transmitted at SP72 and acquires the update information included in the uplink signal.

At SP76, the pen controller 16 of the electronic pen 1 determines whether or not to adopt the candidate communication mode specified by the update information acquired at SP74. Here, it is assumed that a determination result indicating "not adopted" is acquired.

At SP78, the electronic pen 1 transmits the downlink signal including the determination result indicating that the candidate communication mode is "not adopted" to the electronic device 2 and returns to SP70.

At SP70 for the second time, the electronic device 2 selects one type of candidate communication mode that has not yet been selected from among the plurality of types of communication modes. After that, until the determination result indicating "adopted" is acquired at SP76, the electronic pen 1 and the electronic device 2 perform SP70 to SP78 repeatedly in sequence.

At SP80, in the case where the determination result indicating "adopted" is acquired at SP76, the pen controller 16 of the electronic pen 1 determines the corresponding candidate communication mode as the communication mode to be updated to.

At SP82, the electronic pen 1 transmits the downlink signal including the determination result indicating that the candidate communication mode is "adopted" to the electronic device 2. The negotiation operation at SP46B ends in this way, and the pen controller 16 of the electronic pen 1 proceeds to SP48 (FIG. 5).

Summary of Present Embodiment

The input system according to the present embodiment includes the electronic pen 1 and the electronic device 2, which communicates with the electronic pen 1. The electronic device 2 includes the capacitive coupling touch sensor 21, the sensor controller 23, which performs communication control relating to capacitive coupling communication with the electronic pen 1 via the touch sensor 21, and the power transmitter 22, which, in the case where the electronic pen 1 is in the specific state, outputs, to the electronic pen 1, the power supply signal for supplying power to the electronic pen 1 through a different communication from the capacitive coupling communication in response to the command from the sensor controller 23.

The electronic pen 1 according to the present embodiment includes the receiver 11, which receives the uplink signal from the electronic device 2, the transmitter 12, which transmits the downlink signal to the electronic device 2, the power receiver 14, which receives the power supply signal from the electronic device 2 through the different communication, and the pen controller 16, which performs communication control on the receiver 11 and the transmitter 12 according to the communication mode relating to the capacitive coupling communication and acquires data indicated by the power supply signal received by the power receiver 14. The data includes the update information for requesting the update of the communication mode, and the pen controller 16 updates the communication mode or prepares to update the communication mode according to the contents of the update information.

With a method of controlling the electronic pen 1 according to the present embodiment, the pen controller 16 acquires the data including the update information for requesting the update of the communication mode, and the pen controller 16 updates the communication mode or prepares to update the communication mode according to the contents of the update information.

In this way, since the power transmitter 22 outputs the power supply signal through the different communication from the capacitive coupling communication, it is possible to prompt the update of the communication mode in advance in a situation in which there is a high possibility that the capacitive coupling communication is not being performed. This makes it possible to automatically switch or prepare to switch the communication mode relating to the capacitive coupling communication, at a timing earlier than a pen-down operation.

Further, the update of the communication mode may be a switch to one type of communication mode from among a plurality of types of communication modes or a change of the communication control condition for specifying the communication operation of the electronic pen 1 in the one type of communication mode. Further, the update information may include at least one of the type of communication mode, the communication control condition, and the negotiation command requesting negotiation for updating the communication mode.

In the case where the update information includes the type of communication mode, the pen controller 16 may switch to the communication mode corresponding to the type included in the update information and perform the communication operation. This allows the electronic pen 1 to select the type of communication mode indicated by the electronic device 2.

The plurality of types of communication modes may include the unidirectional mode in which the unidirectional communication is performed such that only the transmission of the downlink signal is performed, and the bidirectional mode in which the bidirectional communication is performed such that both the reception of the uplink signal and the transmission of the downlink signal are performed. By matching the communication mode performed by the electronic pen 1 and the electronic device 2 to either the unidirectional mode or the bidirectional mode, it is possible to suppress a delay in the reception of the uplink signal.

The plurality of types of communication modes may include the synchronous mode in which the downlink signal is transmitted in response to the reception of the uplink signal and the asynchronous mode in which the downlink signal is transmitted at a predetermined transmission cycle regardless of the reception status of the uplink signal. By matching the communication mode performed by the electronic pen 1 and the electronic device 2 to either the synchronous mode or the asynchronous mode, it is possible to suppress a delay in the reception of the uplink signal.

Further, the pen controller 16 determines, according to the contents of the update information, whether or not the negotiation operation with the sensor controller 23 to update the communication mode is required to be performed, and in the case where the pen controller 16 determines that the negotiation operation is required to be performed, the pen controller 16 may start the negotiation operation in response to the connection with the electronic device 2 in the capacitive coupling communication. This allows the electronic pen 1 to determine the communication mode to be updated to through the negotiation with the electronic device 2.

In the case where the pen controller 16 determines that the negotiation operation is required to be performed and where the reception of the uplink signal is disabled, the pen controller 16 switches the reception of the uplink signal from disabled to enabled and starts the negotiation operation. This allows the electronic pen 1 to receive the uplink signal from the electronic device 2 and perform negotiation smoothly.

In the case where the pen controller 16 is unable to perform the negotiation operation by the time the valid period has elapsed since it was determined that the negotiation operation is required to be performed, the pen controller 16 may terminate the negotiation operation. This allows the electronic pen 1 to stop an unnecessary operation in a situation in which the negotiation operation is unlikely to be performed.

The pen controller 16 may also determine the communication mode to be changed to through the negotiation operation with the sensor controller 23. Conversely, the sensor controller 23 may determine the communication mode to be changed to through the negotiation operation with the pen controller 16.

Modifications

The present disclosure is not limited to the embodiment described above. That is, design modifications made to the above-described embodiment by those skilled in the art as appropriate also fall within the scope of the present disclosure as long as the modifications have the features of the present disclosure. In addition, the elements included in the embodiment described above can be combined as long as such combinations are technically possible, and such combinations also fall within the scope of the present disclosure as long as the combinations have the features of the present disclosure. Further, the contents or order of execution of each act of the above-described sequence diagrams can be changed as appropriate.

For example, although different communication from the capacitive coupling communication is performed in one direction (that is, data is included in the power supply signal output from the electronic device 2 to the electronic pen 1) in the example of the above-described embodiment, bidirectional communication may be performed. In this case, the electronic pen 1 and the electronic device 2 may perform negotiation relating to the update of the communication mode through the exchange of data while the power supply signal is being output.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An input system, comprising:

an electronic pen; and an electronic device that, in operation, communicates with the electronic pen, wherein:

the electronic device includes:

a touch sensor that, in operation, performs capacitive coupling communication with the electronic pen;

a sensor controller that, in operation, performs communication control relating to the capacitive coupling communication with the electronic pen performed by the touch sensor; and a power transmitter that, in a case where the electronic pen is in a specific state, outputs, to the electronic pen, a power supply signal including data generated by the sensor controller, wherein the power supply signal supplies power to the electronic pen through a different communication from the capacitive coupling communication in response to a command from the sensor controller;

the electronic pen includes:

a receiver that, in operation, receives an uplink signal from the electronic device;

a transmitter that, in operation, transmits a downlink signal to the electronic device;

a power receiver that, in operation, receives the power supply signal from the electronic device through the different communication;

a power storage device that, in operation, is charged when electrical energy included in the power supply signal is supplied to the power storage device; and a pen controller that, in operation, performs communication control on the receiver and the transmitter according to a communication mode relating to the capacitive coupling communication, and acquires the data generated by the sensor controller included in the power supply signal received by the power receiver;

the data includes update information that requests an update of the communication mode;

14 the pen controller, in operation, updates the communication mode or prepares to update the communication mode according to contents of the update information included in the data included in the power supply signal received by the power receiver, the update information included in the data included in the power supply signal received by the power receiver includes a type of the communication mode, the update of the communication mode is a switch from a first one of a plurality of types of communication modes to a second one of the plurality of types of communication modes, the pen controller, in operation, switches to the communication mode corresponding to the type of the communication mode included in the update information included in the data included in the power supply signal received by the power receiver, and the plurality of types of communication modes include:

a unidirectional mode in which unidirectional communication is performed such that only transmission of the downlink signal is performed, and a bidirectional mode in which bidirectional communication is performed such that both reception of the uplink signal and the transmission of the downlink signal are performed.

2. The input system according to claim 1, wherein the update information includes communication control condition, or a negotiation command requesting negotiation to update the communication mode.

3. The input system according to claim 1, wherein the plurality of types of communication modes include:

a synchronous mode in which the downlink signal is transmitted in response to reception of the uplink signal, and an asynchronous mode in which the downlink signal is transmitted at a predetermined transmission cycle regardless of a reception status of the uplink signal.

4. The input system according to claim 1, wherein the pen controller, in operation, determines, according to the contents of the update information, whether a negotiation operation with the sensor controller to update the communication mode is required to be performed.

5. The input system according to claim 4, wherein, in a case where the pen controller determines that the negotiation operation is required to be performed, the pen controller starts the negotiation operation in response to a connection with the electronic device in the capacitive coupling communication.

6. The input system according to claim 4, wherein, in a case where the pen controller determines that the negotiation operation is required to be performed and where reception of the uplink signal is disabled, the pen controller switches the reception of the uplink signal from disabled to enabled and starts the negotiation operation.

7. The input system according to claim 4, wherein, in a case where the pen controller is unable to perform the negotiation operation by a time a valid period has elapsed since the pen controller determines that the negotiation operation is required to be performed, the pen controller terminates the negotiation operation.

8. The input system according to claim 4, wherein the sensor controller, in operation, determines the communication mode to be changed to through the negotiation operation with the pen controller.

9. The input system according to claim 4, wherein the pen controller, in operation, determines the communication mode to be changed to through the negotiation operation with the sensor controller.

10. An electronic pen used with an electronic device that includes a touch sensor that, in operation, performs capacitive coupling communication with the electronic pen, a sensor controller that, in operation, performs communication control relating to the capacitive coupling communication with the electronic pen performed by the touch sensor, and a power transmitter that, in a case where the electronic pen is in a specific state, outputs, to the electronic pen, a power supply signal including data generated by the sensor controller, wherein the power supply signal supplies power to the electronic pen through a different communication from the capacitive coupling communication in response to a command from the sensor controller, the electronic pen comprising:

a receiver that, in operation, receives an uplink signal from the electronic device;

a transmitter that, in operation, transmits a downlink signal to the electronic device;

a power receiver that, in operation, receives the power supply signal from the electronic device through the different communication;

a power storage device that, in operation, is charged when electrical energy included in the power supply signal is supplied to the power storage device; and a pen controller that, in operation, performs communication control according to a communication mode relating to the capacitive coupling communication via the receiver and the transmitter and acquires the data generated by the sensor controller included in the power supply signal received by the power receiver, wherein:

the data includes update information that requests update of the communication mode;

the pen controller, in operation, updates the communication mode or prepares to update the communication mode according to contents of the update information the update information included in the data included in the power supply signal received by the power receiver includes a type of the communication mode, the update of the communication mode is a switch from a first one of a plurality of types of communication modes to a second one of the plurality of types of communication modes, the pen controller, in operation, switches to the communication mode corresponding to the type of the communication mode included in the update information included in the data included in the power supply signal received by the power receiver, and the plurality of types of communication modes include:

a unidirectional mode in which unidirectional communication is performed such that only transmission of the downlink signal is performed, and a bidirectional mode in which bidirectional communication is performed such that both reception of the uplink signal and the transmission of the downlink signal are performed.

11. A method of controlling an electronic pen used with an electronic device, wherein the electronic device includes a touch sensor that, in operation, performs capacitive coupling communication with the electronic pen, a sensor controller that, in operation, performs communication control relating to the capacitive coupling communication with the electronic pen performed by the touch sensor, and a power transmitter that, in a case where the electronic pen is in a specific state, outputs, to the electronic pen, a power supply signal including data generated by the sensor controller, wherein the power supply signal supplies power to the electronic pen through a different communication from the capacitive coupling communication in response to a command from the sensor controller, and wherein the electronic pen includes a receiver that, in operation, receives an uplink signal from the electronic device, a transmitter that, in operation, transmits a downlink signal to the electronic device, a power receiver that, in operation, receives the power supply signal from the electronic device through the different communication, a power storage device that, in operation, is charged when electrical energy included in the power supply signal is supplied to the power storage device, and a pen controller that, in operation, performs communication control according to a communication mode relating to the capacitive coupling communication via the receiver and the transmitter and acquires the data generated by the sensor controller included in the power supply signal received by the power receiver, the method comprising:

acquiring, by the pen controller, data including update information that requests an update of the communication mode; and updating, by the pen controller, the communication mode or preparing to update the communication mode according to contents of the update information, wherein:

the update information included in the data included in the power supply signal received by the power receiver includes a type of the communication mode, the update of the communication mode is a switch from a first one of a plurality of types of communication modes to a second one of the plurality of types of communication modes, the updating includes switching to the communication mode corresponding to the type of the communication mode included in the update information included in the data included in the power supply signal received by the power receiver, and the plurality of types of communication modes include:

a unidirectional mode in which unidirectional communication is performed such that only transmission of the downlink signal is performed, and a bidirectional mode in which bidirectional communication is performed such that both reception of the uplink signal and the transmission of the downlink signal are performed.

12. The method according to claim 11, wherein the pen controller, in operation, updates the communication mode or prepares to update the communication mode according to contents of the update information after the power transmitter stops outputting the power supply signal to the electronic pen.

13. The electronic pen according to claim 10, wherein the pen controller, in operation, updates the communication mode or prepares to update the communication mode according to contents of the update information after the power transmitter stops outputting the power supply signal to the electronic pen.

14. The input system according to claim 1, wherein the pen controller, in operation, updates the communication mode or prepares to update the communication mode according to contents of the update information after the power transmitter stops outputting the power supply signal to the electronic pen.

\* \* \* \* \*